US006554316B2

United States Patent
Schneider et al.

(10) Patent No.: US 6,554,316 B2
(45) Date of Patent: Apr. 29, 2003

(54) MULTI-CHAMBER AIRBAG GAS VENTING SYSTEM

(75) Inventors: David W. Schneider, Waterford, MI (US); Timothy A. DePottey, Flint, MI (US); Brian T. Shellabarger, Sterling Heights, MI (US); Pontus Soderstrom, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/802,300

(22) Filed: Mar. 8, 2001

(65) Prior Publication Data

US 2003/0006596 A1 Jan. 9, 2003

(51) Int. Cl.⁷ .............................................. B60R 21/16
(52) U.S. Cl. ................................ 280/743.1; 280/743.2; 280/739; 280/729
(58) Field of Search ............................ 280/728.1, 729, 280/743.1, 743.2, 739, 731, 730.1

(56) References Cited

U.S. PATENT DOCUMENTS

| | | | |
|---|---|---|---|
| 3,614,127 A | * 10/1971 | Glance | 280/729 |
| 3,802,719 A | * 4/1974 | Brown | 280/729 |
| 5,240,283 A | 8/1993 | Kishi et al. | |
| 5,249,824 A | * 10/1993 | Swann et al. | |
| 5,253,892 A | 10/1993 | Satoh | |
| 5,458,366 A | * 10/1995 | Hock et al. | 280/729 |
| 5,464,250 A | 11/1995 | Satoh | |
| 5,520,413 A | 5/1996 | Mossi et al. | |
| 5,520,414 A | 5/1996 | Bishop | |
| 5,560,649 A | 10/1996 | Saderholm et al. | |
| 5,577,765 A | * 11/1996 | Takeda et al. | |
| 5,791,685 A | 8/1998 | Lachat et al. | |
| 5,901,979 A | 5/1999 | Schneider et al. | |
| 5,906,391 A | * 5/1999 | Weir et al. | 280/729 |
| 5,927,748 A | 7/1999 | O'Driscoll | |
| 6,019,390 A | 2/2000 | Keshavaraj | |
| 6,059,310 A | * 5/2000 | Buss | |
| 6,059,312 A | 5/2000 | Staub et al. | |
| 6,086,095 A | 7/2000 | Keshavaraj | |
| 6,267,408 B1 | * 7/2001 | Jarboe et al. | |

FOREIGN PATENT DOCUMENTS

| | | |
|---|---|---|
| DE | 197 01 709 C2 | 7/2000 |
| DE | 200 07 937 U1 * | 8/2000 |
| EP | 0 657 329 A1 | 9/1994 |
| JP | 4-244453 A * | 9/1992 |
| JP | 8-2364 * | 1/1996 |
| WO | WO 98/42543 | 10/1998 |

* cited by examiner

Primary Examiner—Paul N. Dickson
Assistant Examiner—Ruth Ilan
(74) Attorney, Agent, or Firm—Sally J. Brown; James D. Erickson

(57) ABSTRACT

A multi-chamber airbag venting system which provides for channeling of inflation gas, simple internal tethers, and prevents pre-mature venting. The system includes a front panel, a rear panel, and a middle panel. The middle panel is located between the front and rear panels. The middle panel divides the interior of the airbag into a first chamber between the middle panel and the rear panel, and second chamber between the middle panel and the front panel. The panels are connected to each other along their respective circumferential peripheries. The rear panel includes an airbag mouth to allow gas to enter the airbag. The rear panel further includes a vent hole. The middle panel includes a vent hole connected to the vent hole of the rear panel to form a vent passage. The middle panel includes a middle panel passage hole positioned in the middle panel such that gas entering the airbag through the airbag mouth is channeled from the first chamber to the second chamber. The system further includes an internal tether formed by connecting a portion of the middle panel to the front panel and a portion of the middle panel to the rear panel. The system channels gas entering the first chamber through the middle panel passage hole and into the second chamber. Next, the inflation gas is channeled out of the airbag through the vent passage. In this way, the system effectively channels inflation gas, prevents pre-mature venting, and optimally protects the occupant.

14 Claims, 6 Drawing Sheets

MULTI-CHAMBER AIRBAG GAS VENTING SYSTEM

BACKGROUND OF THE INVENTION

1. The Field of the Invention

The present invention relates to airbag inflation systems in motor vehicles. More specifically, the invention relates to an airbag venting system for directing inflation gases through an airbag.

2. Technical Background

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

A modern airbag apparatus may include an electronic control unit (ECU) and one or more airbag modules. The ECU is usually installed in the middle of an automobile, between the passenger and engine compartments. If the vehicle has a driver airbag only, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag to impact a passenger and prevent injury to the passenger. In some airbag apparatuses, the airbag may be fully inflated within 50 thousandths of a second and deflated within two tenths of a second.

An airbag cover, also called a trim cover panel, covers a compartment containing the airbag module and may reside on a steering wheel, dashboard, vehicle door, vehicle wall, or beneath the dash board. The airbag cover is typically made of a rigid plastic and may be forced open by the pressure from the deploying airbag. In deploying the airbag, it is preferable to retain the airbag cover to prevent the airbag cover from flying loose in the passenger compartment. If the airbag cover freely moves into the passenger compartment, it may injure a passenger.

Airbag apparatuses have been primarily designed for deployment in front of the torso of an occupant between the upper torso of an occupant and the windshield or instrument panel. Conventional airbags, such as driver's or passenger airbags (hereinafter referenced as the "primary airbag"), protect the occupant's upper torso and head from colliding with a windshield or instrument panel.

Airbag apparatuses are generally designed under the assumption that the occupant is riding in the vehicle in a forward facing seated position with both feet on the vehicle floor. When an occupant is not in this position the occupant or occupant's body part is said to be 'out of position.' As an occupant occasionally is 'out of position', airbag apparatus designs which are effective regardless of the occupant's position are advantageous.

In an accident situation involving a primary airbag, there are three phases which follow each other between the beginning of the accident and the end. In the inflation phase, the goal is to fully inflate the primary airbag to occupy a majority of space between an instrument panel and an occupant before the occupant moves significantly forward in the vehicle compartment. In this phase, the primary airbag fully inflates in response to a signal from the ECU within about 50 thousandths of a second.

Next, there is the impact phase in which the goal is to impact the occupant's body in such a manner as to reduce injuries to the occupant. Generally, a flat, soft surface best accomplishes the goal of this phase. The primary airbag and the occupant's upper torso collide. The primary airbag and occupant's upper torso then react to each other in response to the collision.

Finally, the last phase is the deflation phase. The goal in this phase is to bring the occupant's upper torso to a resting state without allowing the upper torso to collide with other rigid structures in the vehicle. The goal is accomplished by releasing the gas which inflated the primary airbag at a rate which is slower than the speed at which the occupant's body is moving forward.

Airbag apparatuses seek to meet the goals of all three phases. Meeting the goals of the inflation and deflation phases is the most challenging. Airbag apparatus designs must function within tight parameters of physics in order to protect a vehicle occupant involved in an accident. During a front end collision, if the occupant is restrained by a seat belt, the occupant's upper torso bends at the waist and hits the primary airbag. Airbag apparatuses are generally small compact units which are capable of presenting the inflated primary airbag in front of a vehicle occupant before the occupant's upper torso moves significantly forward. Because of the short time interval between the start and end of an accident situation, the primary airbag must be inflated very rapidly. The high inflation rate causes the front surface of a conventional primary airbag to travel to within inches of an 'in position' occupant's upper torso at a rate around 200 miles per hour.

Most airbags provide a release for the gas within the airbag. This release is called venting. By venting the gas in the primary airbag, the impact forces of the occupant's torso are absorbed.

The venting of gas from the primary airbag should fall within certain timing parameters. First, the venting should not occur too early in the accident sequence. Second, the venting rate should not be too slow.

If venting occurs too early, such as during the inflation phase, then the primary airbag may be under inflated at the time of impact with the occupant. An under inflated bag provides less restraint and increases the likelihood of impact between the occupant and the interior of the vehicle. If a primary airbag vents gas too slowly, then the airbag may be too rigid to effectively protect the occupant.

When an occupant collides with the primary airbag, the occupant's body compresses the gas within the airbag. If there is no release of gas, then the compression stops and the textile bag presents a rigid structure resisting the forward movement of the occupant's body. But, if the airbag has structure to provide the desired rate of venting then the impact force of the occupant is transferred to gas inside the airbag. The gas reacts by pushing against other gas within the airbag. This forces gas out the vent structure at the desired rate. The force of impact is transferred to the gas within the airbag and then to the air outside the airbag. The desired rate of venting is reached by forming holes in the airbag. These holes may be half circle cuts in the bag, tear seams, multiple holes, or other like release mechanisms placed in the bag to ensure that the desired venting rate is reached and held constant during the deflation phase.

A constant venting rate results in fewer injuries to the occupant. A constant venting rate also allows the airbag to slow the occupant's body at a constant rate. The restraining force which the airbag is placing on the occupant is constant. The occupant's body is better able to withstand restraining forces when they are applied constantly over time.

Airbag apparatuses are installed in various different vehicles which convey occupants of varying shapes and sizes. One occupant may fit the optimal 'in position' requirements while another may not. Therefore, airbag designs which meet the goals of the three phases must accommodate for the variety among vehicle and occupants. Multi-chamber airbag apparatuses have been developed to accommodate the variations.

A multi-chamber airbag apparatus is one in which there are two or more chambers within the airbag which are inflated during the inflation phase. Dividers within the airbag form the chambers. The dividers are generally made of the same textile material as the airbag. Multiple chambers allow the airbag to reach full inflation at a similar rate as a single chamber airbag. But, the airbag's front surface is not traveling toward the occupant as rapidly. Therefore, injuries to occupants, including those "out of position," may be less severe.

Generally in a multi-chamber airbag apparatus, inflation of each chamber is accomplished by openings in the chamber dividers. The inflator is connected in a conventional manner. The multi-chamber airbag apparatus has holes in the dividers to allow gas to pass from one chamber to the next. A first chamber surrounds the inflator. Once the first chamber is substantially filled, the gas moves through the holes to the one or more other chambers until the whole airbag is inflated.

Vents are formed in the multi-chamber airbag to cause the airbag to release pressure once the occupant impacts the airbag. In single chamber and conventional multi-chamber airbags, the vent holes are located such that a direct path exists for the gas to travel between the inflator and the vent holes. A direct path is one in which the gas may leave the inflator and travel directly out of the vent without having to traverse the majority of a particular chamber. The result is that a significant quantity of the gas inflating the chamber may exit through the vent hole rather than completing inflation of the one or more chambers prior to exiting the airbag. This is called pre-mature venting. To compensate for premature venting, more propellant may be used in the inflator. The increase in propellant may require an increase in the size of the inflator which in turn may increase the size of the whole multi-chamber airbag apparatus. A solution to premature venting is to force the gas to travel through all the chambers of the airbag prior to exiting by way of a vent hole.

It is desirable that vent holes be formed in a chamber which is furthest from the inflator. This forces the inflation gas to travel throughout the airbag prior to exiting. This ensures that the inner chambers are completely filled before gas is allowed to escape. Conventional airbags do not channel the inflation gas to eliminate pre-mature venting. Instead, conventional airbags use larger inflators or higher output inflators to compensate for pre-mature venting.

Multi-chamber airbag apparatuses are effective in meeting the goals of the impact phase. As described above, a goal of the impact phase is to present a soft generally flat surface to impact the occupant. A conventional inflated airbag has a convex arced front surface which is presented for impact with the occupant. A non-flat airbag surface creates a tendency for the occupant to slide along the curved surface and off the airbag, particularly when the occupant is unbelted or "out of position." To flatten the arc, various tethering structures have been developed.

A tether is a structure of the airbag apparatus which limits the forward movement of the front surface to a particular distance. Generally, one or more tethers are used to flatten the arc of the airbag front surface. Tethers may be formed from the same textile material as the airbag. Tethers are generally attached to the front surface of the airbag at one end. The other end is attached near the throat or area where the airbag material is attached to a rigid structure such as the inflator, or housing. The body of the tether may be located either internal or external to the airbag. Tethers which are separate members often involve complicated or expensive fastening mechanisms. Such mechanisms include sewing the tether to the airbag, securing the tether with a loop and pin assembly, glueing the tether to the airbag, welding the tether to the airbag, and the like. These mechanisms require skilled workers who know where to attach the tethers and how to operate machines which fasten the tethers. If the tether is a separate member and must be positioned within the airbag then the process of assembling the airbag may be even more complicated than external tethers.

Multi-chamber airbags provide a unique solution to the problems involved with tethers which are installed on the inside of an airbag. Multi-chamber airbag apparatuses generally exhibit tethering functionality because the chamber dividers are connected to the front and rear surface of the airbag. The divider functions as a tether because the front surface is prevented from moving outward beyond the length of the divider. Multi-chamber airbag apparatuses which provide internal tethering do exist. However, these apparatuses do not include an ability to channel the inflation gas within the airbag between the inflator and the vent holes.

Accordingly, it would be an advancement in the art to provide a multi-chamber airbag venting system which reduces the velocity of the front surface of the airbag during the inflation phase of an accident situation. A further advancement in the art would be to provide a multi-chamber airbag venting system which channels inflation gas in series through a plurality of internal chambers such that each chamber is substantially inflated prior to venting of inflation gas. It would be another advancement in the art to provide a multi-chamber airbag venting system which provides internal tethering without complicated fastening of tethers and without requiring high skill of the airbag assembly worker. A further advancement in the art would be to provide a multi-chamber airbag venting system which combines the advantages of multi-chamber airbags which channel inflation gas and multi-chamber airbags which provide simple internal tethers. The present invention provides these advancements in a novel and useful way.

BRIEF SUMMARY OF THE INVENTION

The apparatus of the present invention has been developed in response to the present state of the art, and in particular, in response to the problems and needs in the art that have not yet been fully solved by currently available multi-chamber airbag venting systems. Thus, the present invention provides a multi-chamber airbag venting system which provides channeling of the inflation gas and simple internal tethers to provide a safe inflation phase, generally planar impact surface, and a fully inflated airbag which deforms properly and prevents pre-mature venting.

In one embodiment of a multi-chamber airbag venting system, the system includes a front panel, a rear panel and a middle panel. Each panel is a piece of textile fabric conventionally used in fabricating airbags. The textile material used is a nylon or polyester weave. The front and rear panels are substantially the same size and shape. The front and rear panels are shaped and sized such that once joined along their respective circumferential peripheries and filled with gas the airbag occupies the desired volume of space between the vehicle occupant and the interior of a vehicle. The rear panel includes an airbag mouth. The airbag mouth secures the airbag to the inflator or housing. The airbag mouth also serves as a passage which allows the inflation gas leaving the inflator to enter the airbag.

The middle panel is positioned between the front panel and rear panel. The middle panel is substantially the same size and shape as the front panel and rear panel. Alternatively, the middle panel may be smaller than the front panel and rear panel. The middle panel is connected to the front panel and rear panel along their respective circumferential peripheries. The middle panel divides the interior of the airbag into a first chamber behind the middle panel and a second chamber in front of the middle panel. Alternatively, the middle panel may be connected to the front panel and rear panel in any manner which divides the interior of the airbag into at least two chambers. The middle panel includes one or more middle panel passage holes. The middle panel passage holes are disposed along the perimeter of the middle panel. Alternatively, the middle panel passage holes may be disposed at any point in the middle panel within the circumferential periphery which secures the middle panel to the front panel and rear panel.

The system further includes vent holes. A vent hole is a hole in the airbag which allows the gas inside the airbag to escape. A first vent hole is disposed in the rear panel. A second vent hole is disposed in the middle panel. The first vent hole and second vent hole are of substantially the same size. The first vent hole and second vent hole are sized to provide the desired venting rate. To ensure the airbag does not vent too quickly, the vent holes are sized in proportion to the volume of the airbag. The first vent hole and second vent hole are attached to each other to form a vent passage. A vent passage allows gas to escape from a chamber in the airbag to an area external to the airbag.

In alternative embodiments, the system may also include a plurality of middle panels between the front panel and rear panel wherein each additional panel divides the interior into an additional chamber. Alternatively, a plurality of vent passages may be formed by a plurality of first vent holes and a plurality of second vent holes. In a further alternative embodiment, the middle panel may include a plurality of middle panel passage holes.

In further embodiments, the system includes a tether. A tether is a structure formed by connecting the middle panel to a portion of the front panel and connecting the middle panel to a portion of the rear panel. The tether restricts the distance the front panel travels away from the inflator once inflated. Alternatively, the system may include a plurality of tethers which restrict the distance the front panel travels during inflation.

The system may also include a second tether. The second tether is formed by connecting the middle panel to a portion of the rear panel. The second tether serves to restrict the distance the middle panel travels during inflation.

The system may also include a restrictor and a central restrictor. The portion of the front panel connected to a portion of the middle panel forms a central restrictor. The portion of the rear panel connected to a portion of the middle panel forms a restrictor. The central restrictor may be located at substantially the center of the front panel. The restrictor may include the first vent hole and second vent hole discussed above. The connections of the panels which form the central restrictor and restrictor may be formed by weaving, sewing, glueing or welding the two panels together at points where the restrictor is desired.

In the preferred embodiment of a multi-chamber airbag venting system, the components are sized and configured for use in a vehicle driver and/or passenger airbag. The front panel, rear panel, and middle panel may be shaped to accommodate the volume between the vehicle occupant and the vehicle interior.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained and be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which:

FIG. 2 illustrates the location of vents as well as the path inflation gas follows.

FIG. 4 illustrates the components which form the internal tethering system for the present invention.

FIG. 2 illustrates the location of vents as well as channeling of inflation gas.

DETAILED DESCRIPTION OF THE PREFERRED EMBODIMENTS

The present invention can be better understood with reference to the drawings where like parts are designated with like numerals throughout.

Figure 1:
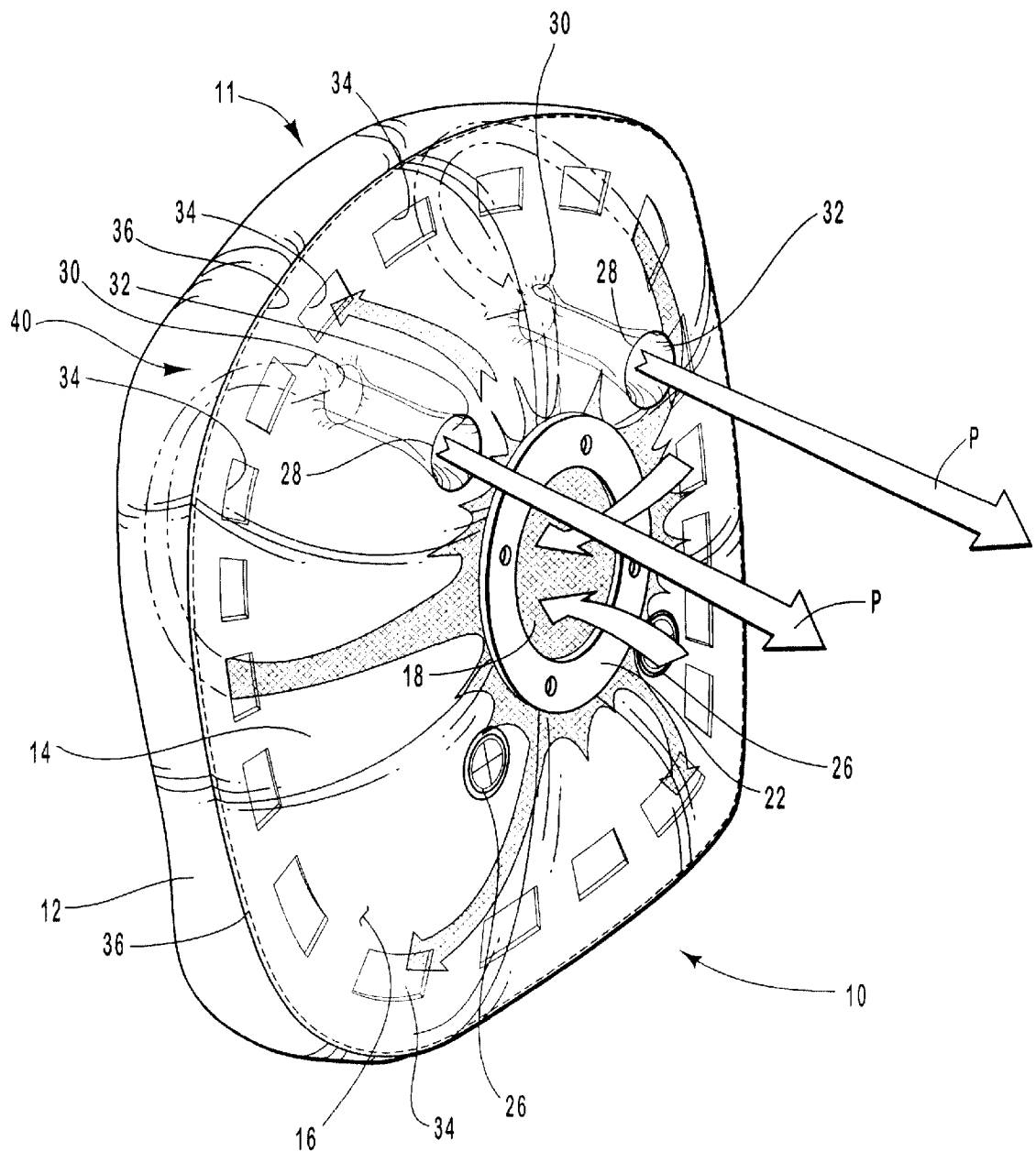
FIG. 1 is a perspective view of one embodiment of a multi-chamber airbag venting system illustrating the major components and the path inflation gas travels through the airbag.

FIG. 1 is a perspective view of one embodiment of an inflated multi-chamber airbag venting system 10. The system 10 may be implemented in a driver's side or passenger airbag.

The airbag 11 is made of textile material commonly used in the industry. The textile material is generally a nylon or polyester weave. Alternatively, plastic may be used. The airbag 11 is formed from a front panel 12, a middle panel 14 and a rear panel 16. Alternatively, the airbag 11 may have more than one middle panel 14. Each panel is made from the same textile material commonly used to fabricate airbags 11. Alternatively, each panel may be made from another durable, strong, flexible material.

The front panel 12 forms the front surface of the airbag 11 which impacts a vehicle occupant in an accident situation. It is desirable that the front panel 12, once inflated, is generally planar. It is also desirable that the front panel 12 inflate with less velocity than conventional airbags 11. The present invention provides these advantages with structures discussed below.

The rear panel 16 forms the rear surface of the airbag 11. The rear panel 16 includes an airbag mouth 18. The airbag mouth 18 is a hole in the rear panel 16 which allows the inflation gas to enter the airbag 11. The airbag mouth's 18 size and shape depend largely on what type of airbag 11 is involved, and whether the airbag mouth 18 receives an inflator 20 (See FIG. 4) or a structure which places the airbag 11 in fluid communication with the inflator 20.

As illustrated in FIG. 1, the airbag mouth 18 receives the inflator 20. Because inflators 20 output inflation gas at a very high velocity, airbag 11 is secured by way of the airbag mouth 18 to a rigid structure such as the inflator 20 which is secured to an airbag housing (not shown). Alternatively, the airbag mouth 18 may be secured to the airbag housing itself. The airbag mouth 18 is secured to the rigid structure by a ring fastener 22 using studs (not shown). Alternatively, the airbag mouth 18 may be secured by various other techniques including clamps, welding, loop and pin assemblies, and the like.

Referring still to FIG. 1, the rear panel 16 further includes a restrictor 26 and a vent hole 28. A restrictor 26 is a structure which is formed in a portion of a first airbag panel when a second airbag panel is secured to the first airbag panel. A restrictor 26 serves two purposes. First, a restrictor 26 restricts the separation of adjoining airbag panels. Restrictors 26 provide a way to control the surfaces of airbag panels during inflation. Because airbag panels are made of flexible material, when an airbag is inflated the surfaces are convex in shape. A convex external surface increases the likelihood the occupant will slide off the airbag 11 after impact. Including one or more restrictors 26 between the airbag panels, results in front surfaces which are generally planar. Second, restrictors 26 restrict the free movement of inflation gas and reduce the volume between two airbag panels. Restriction of free movement of gas between airbag panels and changing the volume is useful in altering the trajectory of the airbag 11 during inflation. This results in an airbag 11 trajectory initially directed away from the occupant.

In the present invention, the restrictor 26 is formed by securing a portion of the middle panel 14 to a portion of the rear panel 16. Securement is accomplished by weaving the middle panel 14 to the rear panel 16 in one of a variety of patterns. Alternatively, securement may be accomplished by sewing, welding, glueing, or the like. As illustrated in FIG. 1, the rear panel 16 may include more than one restrictor 26.

The restrictors 26 of the rear panel 16 limit the volume between the rear panel 16 and the middle panel 14. The restrictors 26 also limit and redirect the movement of gas between the middle panel 14 and the rear panel 16.

Referring still to FIG. 1, a vent hole 28 allows gas within an airbag 11 to escape. As discussed above, the size and location of a vent hole 28 determines the venting rate for the airbag 11. The venting rate has a direct effect on the restraint capabilities of the airbag 11. The rear panel 16 may have more than one vent hole 28. The venting rate desired determines the size and shape of a vent hole 28. The vent hole 28 is formed by cutting a hole after forming the rear panel 18. Alternatively, the vent hole 28 may be formed by weaving, drilling, or burning a hole into the rear panel 18.

The middle panel 14 is positioned between the front panel 12 and the rear panel 16. The middle panel 14 serves to divide the interior of the airbag 11 into multiple areas such that the system 10 may obtain the beneficial characteristics of multi-chamber airbags 11 discussed above. The middle panel 14 includes a vent hole 30. The vent hole 30 of the middle panel 14 serves the same purpose and is sized just as the vent hole 28 of the rear panel. Vent hole 30 is positioned and secured to vent hole 28 such that a vent hole passage 32 is formed between vent hole 30 and vent hole 28. Vent hole passage 32 functions in the similar to a restrictor 26. Alternatively, vent hole 30 may be positioned in the middle panel 14 such that once the airbag 11 is inflated vent hole 30 aligns with the hole 28 to form vent hole passage 32. In this alternative configuration, vent hole 30 may be sized differently from vent hole 28. This difference in sizing provides an additional technique for altering the vent rate from the airbag 11.

The middle panel 14 further includes a middle panel passage hole 34. A middle panel passage hole 34 allows gas on one side of the middle panel 14 to pass through to the other side of the middle panel 14. The system 10 may include more than one middle panel passage holes 34. A middle panel passage hole 34 is sized and shaped to control the rate at which gas passes from one side of the middle panel 14 to the other. If the middle panel passage hole 34 is relatively large in comparison to the volume of gas on one side, then the gas passes to the other side at a higher rate than if the middle panel passage hole 34 is relatively small. By changing the size, shape, location, and number of middle panel passage holes 34, the rate of flow of gas on either side of the middle panel 14 may be controlled.

Referring still to FIG. 1, the front panel 12 and rear panel 16 cooperate to provide the main structure of the airbag 11. The front panel 12 and rear panel 16 are joined by a seam 36 along their respective circumferential peripheries. The seam 36 is formed by weaving the front panel 12 to the rear panel 16. Alternatively, the seam 36 may be formed by other techniques common in the art including glueing, sewing, welding, and the like.

By joining the front panel 12 and rear panel 16 to form seam 36, an interior space is formed. This space is divided into a first chamber 38 and second chamber 40 by middle panel 14. As illustrated in FIG. 1, the middle panel 14 divides the interior space by including the circumferential periphery of the middle panel 14 between the respective circumferential peripheries of the front panel 12 and rear panel 16 when forming the seam 36. Alternatively, the middle panel 14 may be connected between the front panel 12 and rear panel 16 in various other configurations such that a first chamber 38 and second chamber 40 are formed.

The middle panel 14 provides a barrier between the first chamber 38 and the second chamber 40 such that inflation of the interior area which makes up the second chamber 40 is delayed. In conventional single chamber airbags, the interior area fills with inflation gas at approximately the same time. The high velocity gas filling the interior area causes the material of the airbag surrounding the interior to expand at the same rate at which the inflation gas is filling the interior.

Figure 3:
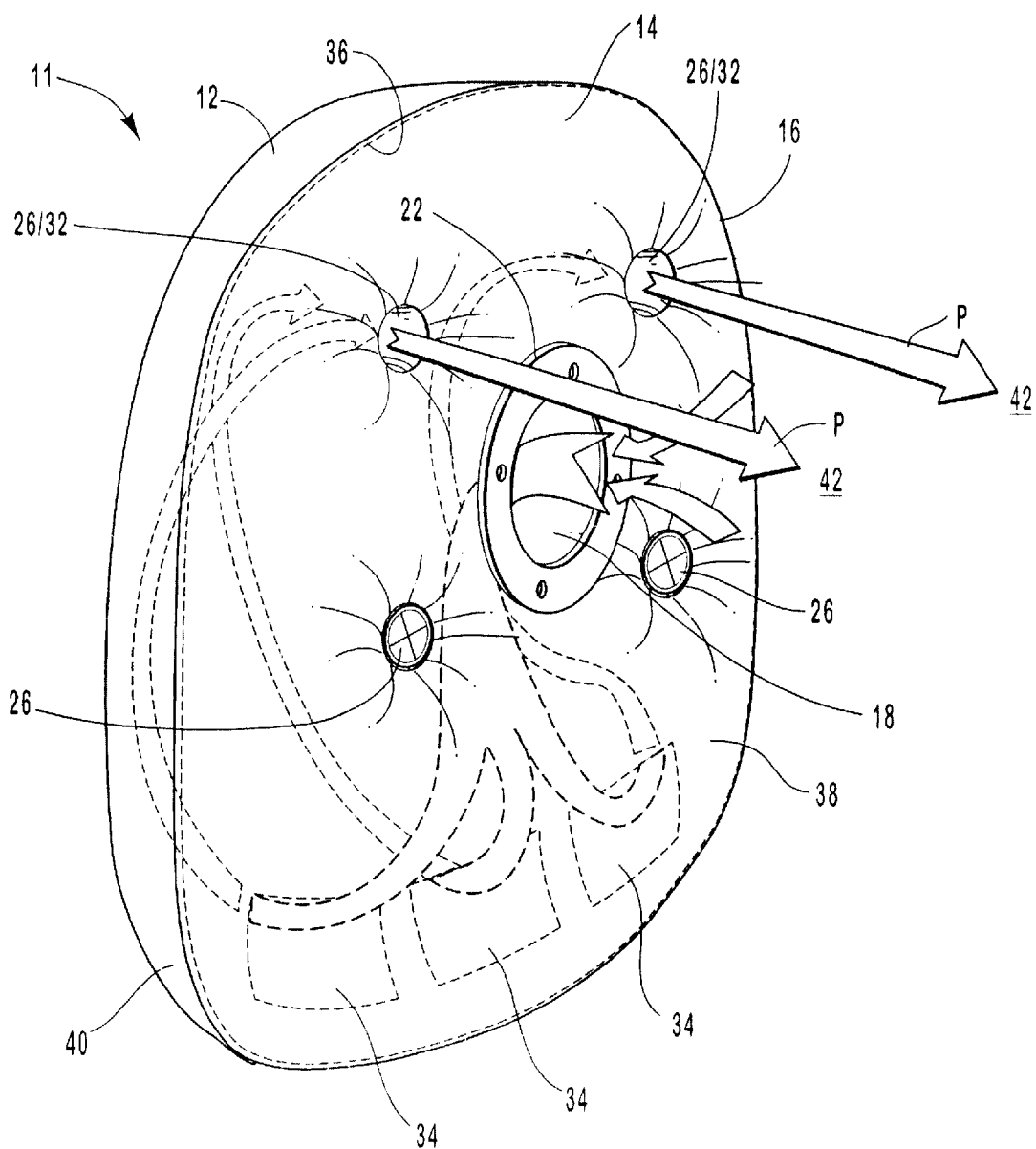
FIG. 3 is a rear perspective view of one embodiment of the present invention illustrating the path inflation gas follows as well as the vents and restrictors.

In the present invention, the inflation gas travels from the first chamber 38 to the second chamber 40 at different velocities. In an accident situation, the electronic control unit ("ECU") signals the inflator 20 to release the inflation gas. The inflator 20 triggers the release of inflation gas at a very high velocity. As illustrated in FIG. 3, the high velocity inflation gas enters the first chamber 38 immediately after leaving the inflator 20. The middle panel 14 and rear panel 16 defining the first chamber 38 respond by attempting to separate which expands the first chamber 38. Immediately after the inflator 20 is triggered, the second chamber 40, defined by the middle panel 14 and the front panel 12, has received little or no inflation gas. Next, the gas within the first chamber 38 is forced to enter the second chamber 40 by way of one or more middle panel passage holes 34. The gas passing through the middle panel passage holes 34 has lost velocity by impacting the middle panel 14 and one or more restrictors 26. The gas entering the second chamber 40 impacts the front panel 12. The gas transfers most of its velocity to the front panel 12 which reacts by attempting to separate from the middle panel 14. The separation of the front panel 12 from the middle panel 14 expands the second chamber 40. The gas filling the second chamber 40 causes the exterior surface of the front panel 12, which faces the occupant, to initially accelerate in an area around the middle panel passage holes 34. This means the front panel 12 initially inflates with a radial trajectory which is away from the center of the airbag 11. Then, the second chamber 40 fills causing the front panel 12 to accelerate towards the occupant at approximately the velocity of the gas entering the second chamber 40. Because the gas entering the second chamber 40 has a lower velocity, and a radial trajectory, the front panel 12 moves towards the occupant at a velocity which is less than a front panel 12 in a traditional single chamber airbag. If the front surface of the front panel 12 impacts an occupant, particularly one "out of position," the risk of significant injury is reduced.

The size and shape of the front panel 12, middle panel 14, and rear panel 16 depends on a variety of factors including the size of the volume the inflated airbag must occupy, and the location of the airbag within the vehicle. Generally, the front panel 12, middle panel 14 and rear panel 16 are of approximately the same size and shape. Alternatively, the middle panel 14 may be smaller than the front panel 12 and the rear panel 16 such that the shape defined by the seam 36 is smaller. Another alternative may be to size one panel smaller than the others to accommodate space restrictions imposed by other structures in a vehicle's interior such as a steering wheel or instrument panel.

Figure 4:
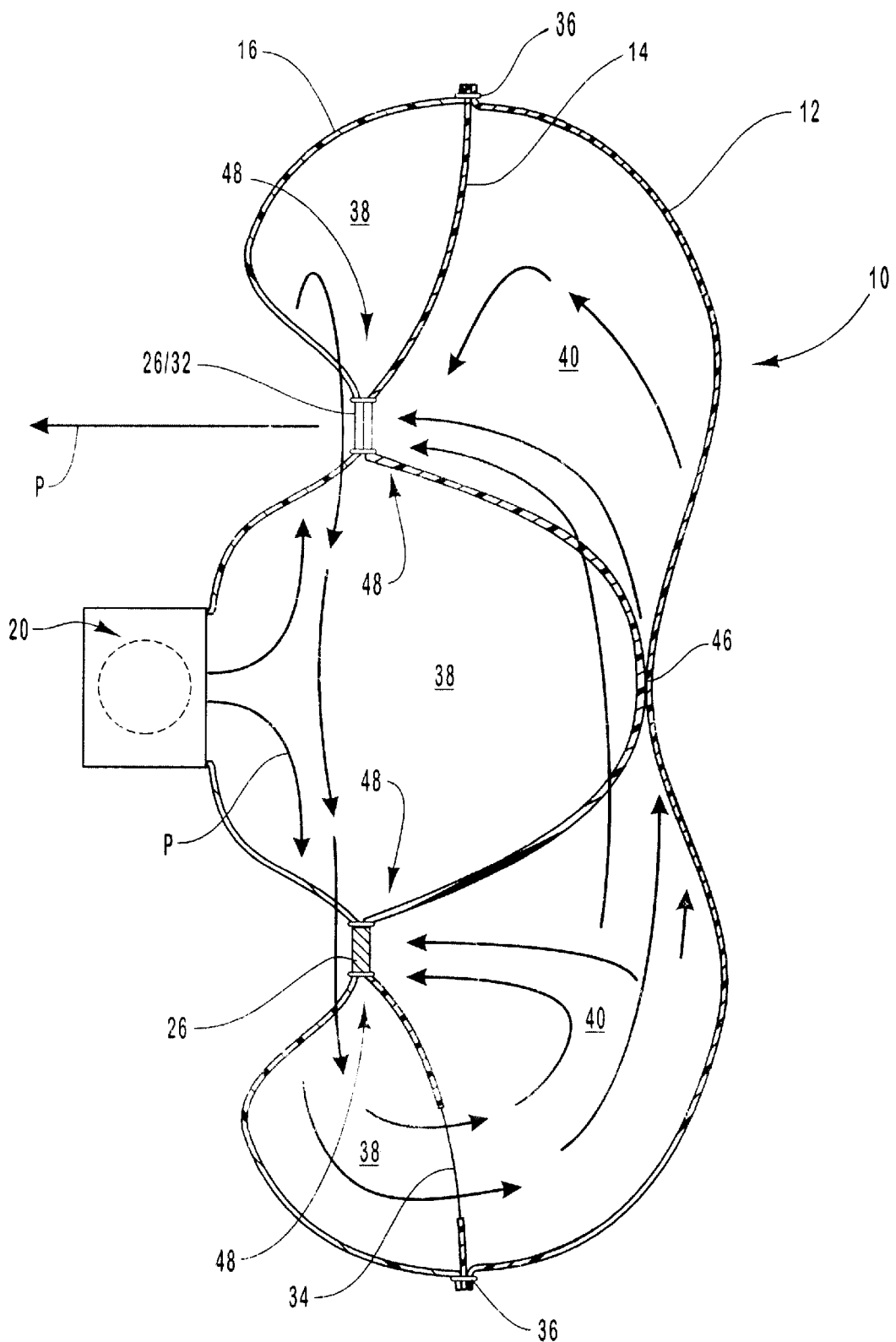
FIG. 4 is a cross-sectional side view of one embodiment of the present invention.

FIGS. 1 and 4 also illustrate path P. Path P indicates the path and direction the inflation gas must travel through the chambers of the airbag 11. As illustrated in FIG. 4, the inflation gas begins at an inflator 20. Inflation gas leaving the inflator 20 immediately enters first chamber 38. Generally, the inflation gas output from the inflator 20 is sufficient to fill both chambers. The inflation gas within the first chamber 38 is forced by subsequent inflation gas to enter the second chamber 40 by way of one or more middle panel passage holes 34. Once the gas has filled a majority of the second chamber 40, the gas begins to exit the airbag 11 by way of vent passage 32 formed by vent hole 28 and vent hole 30.

FIG. 1 illustrates an embodiment of the system 10 having more than one vent passage 32.

Figure 2:
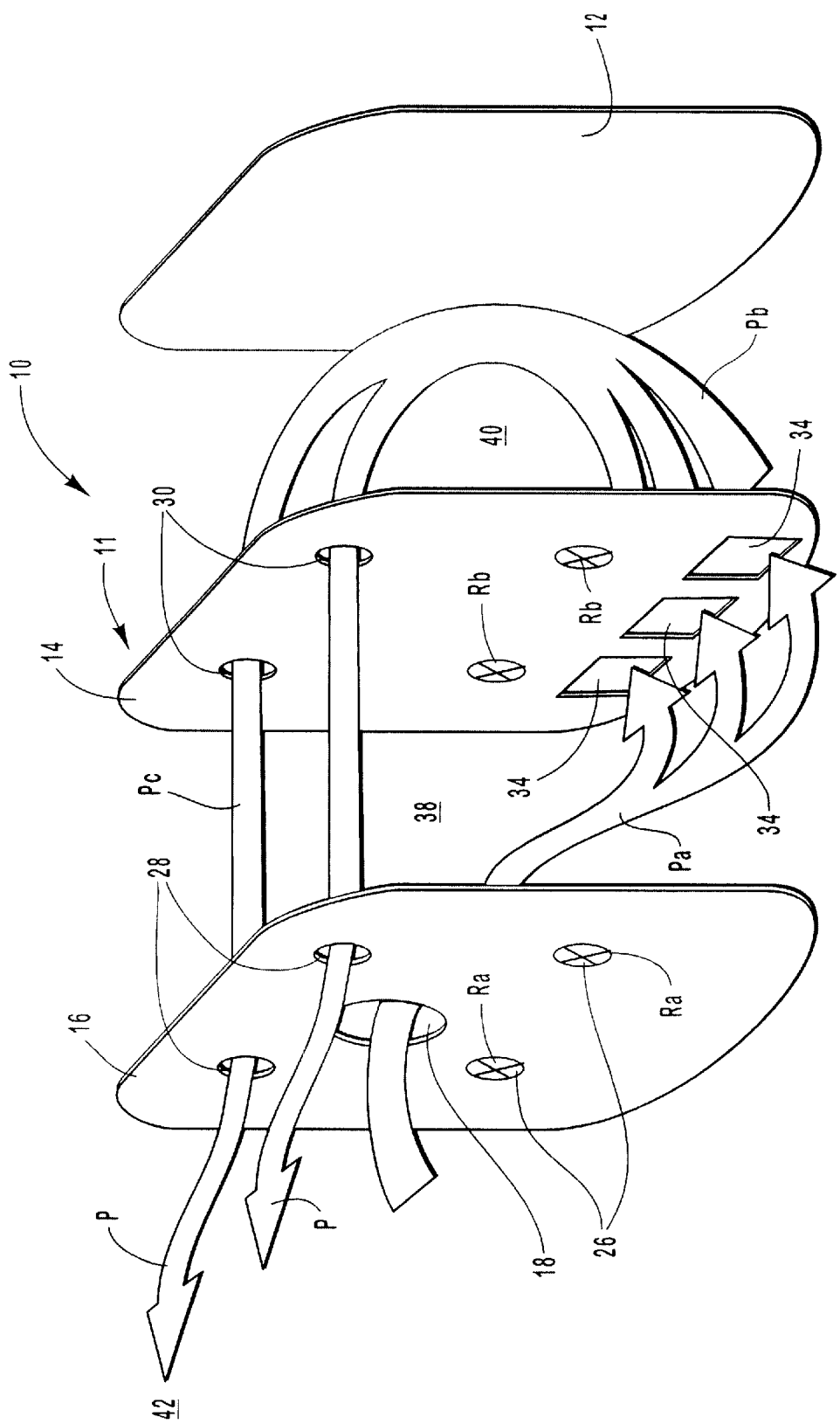
FIG. 2 is an exploded perspective view of the front panel, middle panel and rear panel of the present invention.

FIG. 2 is an exploded perspective view of the system 10 illustrating in more detail the path P of inflation gas through the system 10. FIG. 2 also illustrates the inflation gas channeling feature provided by the system 10. The front panel 12, middle panel 14 and rear panel 16 are illustrated as rigid planes such that the path P may be clearly discernable.

The path P is further divided into portions $P_a$, $P_b$, and $P_c$ for clarity. Preferably, the inflation gas begins at an inflator 20 (not shown in FIG. 2) within the airbag mouth 18. Alternatively, the gas may enter the airbag mouth 18 from some other gas communication structure. This begins the inflation phase discussed above. After passing through or originating at the airbag mouth 18, the gas fills the majority of the first chamber 38. The gas is then channeled along path portion $P_a$ toward the lower part of the first chamber 38 due to the middle panel passage holes 34 being located in the lower portion of the middle panel 14. Vent holes 30 are sized substantially smaller than the middle panel passage holes 34. The vent holes 30 are made unavailable to gas within the first chamber 38 by securing vent holes 30 to corresponding vent holes 28 to form vent passages 32. In embodiments in which the vent holes 30 are not secured to vent holes 28, the difference in size between vent holes 28,30 and middle panel passage holes 34 causes a majority of the gas to be channeled through the middle panel passage holes 34.

Initially the gas passes through the middle panel passage holes 34, enters the second chamber 40, and begins to fill the second chamber 34. Additional gas continues to enter the second chamber 34 through the middle panel passage holes 34. The entering gas forces the initial gas to follow path portion $P_b$ toward vent hole 30. This completes the inflation phase. Inflation gas has filled the first chamber 38 and the second chamber 40. An inflated airbag 11 is presented for impact with by the occupant.

Referring still to FIG. 2, the occupant impacting the airbag 11 begins the impact phase. The impact phase is short in comparison to the inflation and deflation phase. The impact phase begins once the occupant's body contacts the front surface of the front panel 12 of the airbag 11. The impact phase ends when the occupant's body begins to compress the airbag 11.

The compression of the airbag 11 by the occupant's body begins the deflation phase. At this point, the airbag 11 is typically fully inflated. There is a tight seal preventing the gas from exiting the first chamber 38 by way of the airbag mouth 18 or the seam 36. The compression of the airbag 11, caused by impact, forces the gas to follow path portion $P_c$. Path portion $P_c$ leads from the second chamber 40 through vent passage 32, formed by vent hole 30 and vent hole 28, to the exterior 42 of the airbag 11. The deflation phase concludes once the airbag 11 is fully deflated or the occupant's body is brought to a resting state.

FIG. 2 also illustrates in more detail the portion of the panels which make up restrictors 26. A restrictor 26 includes portions $R_a$ and $R_b$. Portion $R_a$ is a part of rear panel 16. Portion $R_b$ is a part of middle panel 14. Portion $R_a$ and portion $R_b$ are secured by techniques common in the industry, as discussed above. FIG. 2 illustrates portion $R_a$ and portion $R_b$ secured by attaching using a particular pattern. The pattern illustrated is a circle surrounding an X. This pattern affords the necessary securement to withstand the stress placed on the restrictor 26 during the operation of the airbag 11.

FIG. 3 is a rear perspective view illustrating the embodiment of FIG. 2 fully assembled. As discussed above, it is desirable to control the restraint and rigidity characteristics of an airbag 11. FIG. 3 illustrates a few of the tools the present invention provides an airbag designer in controlling those characteristics.

Restraint and rigidity characteristics relate to how well an airbag 11 catches and restrains an occupant's body in an accident situation. Catching an occupant's body refers to the ability of an airbag to retain contact with the body of an occupant once contact has been made. An airbag 11 which is very rigid increases the likelihood that the occupant's body will bounce or slide off the airbag 11. If an airbag fails to catch an occupant's body, the occupant's body will impact rigid structures within the vehicle. Additionally, a very rigid airbag may itself cause serious injury to the occupant.

Restraining an occupant's body relates to how effectively the airbag 11 slows the forward motion of the body and brings the body to rest without allowing the body to impact the instrument panel (not shown). The effectiveness of an airbag 11 for occupant restraint is directly related to the velocity of the occupant on impact, the volume of the space the airbag must occupy, and the venting rate of the airbag 11.

The present invention allows for control of the venting rate of an airbag 11. However, an optimal venting rate must be achieved because the venting rate is inversely related to the catch and restraint characteristics. If the gas escapes more quickly, high venting rate, the catching ability is improved. But, the restraint ability is degraded, and vice versa. An increased venting rate causes the airbag 11 to deform more quickly under the load of the occupant's body which helps ensure the body does not slide off the airbag 11. Thus, an improved catch characteristic is the result. However, the increased venting rate allows the occupant to close the distance between the front panel 12 and the instrument panel more quickly. This may leave little or no gas within the airbag 11 to restrain the occupant from colliding with the instrument panel. Conversely, a decreased venting rate, slower gas release, improves the likelihood the occupant's body will slide off the airbag 11, particularly if unbelted or "out of position," and improves the ability of the airbag 11 to restrain the occupant.

The multi-chamber airbag venting system 10 provides for control of the venting rate by changing the configuration of members of the system 10 illustrated in FIG. 2. For example, the size of vent holes 28 and vent holes 30 will effect the venting rate. Additionally, whether or not vent hole 28 is secured to vent hole 30 will effect the venting rate. Furthermore, the number of vent passages 32 effects the venting rate.

The rigidity of the airbag 11 at the time of impact is effected by controlling the inflation rate of the second chamber 40. The inflation rate of the second chamber 40 may be controlled by adjusting the configuration of several other members of the system 10. As illustrated in FIG. 3, the middle panel passage holes 34 may be positioned as far away from the vent passages 32 as possible. By doing so, the gas is channeled throughout the second chamber 40 before exiting through vent passages 32. The greater distance between vent passages 32 and middle panel passage holes 34 provides a slight delay before second chamber 40 reaches full inflation. The inflation rate of the second chamber 40 may also be controlled by the size, location and number of middle panel passage holes 34. Altering the volume of the first chamber 38 by reducing the size of the rear panel 16 and/or middle panel 14 will increase the inflation rate of the second chamber 40 assuming the amount of inflation gas remains unchanged. The size and number of restrictors 26 used between the middle panel 14 and the rear panel 16 also effects the volume of the first chamber 38.

Therefore, by a technical and detailed analysis and minimal trial and error testing, an airbag designer may adjust the configuration of the system 10 to achieve the optimal rigidity and restraint characteristics from the system 10. The ability to change these characteristics by changing the configuration of the system 10 offers advantages over conventional airbags. The airbag designer implementing the system 10 is capable of obtaining optimal characteristics and occupant protection.

FIG. 4 is a cross-sectional side view illustrating restrictors 26, and the channeling and tethering features of the present invention. The channeling feature is illustrated by path P and discussed above. Restrictors 26 are also discussed above at great length. Restrictors 26 may be distinguished by different names which indicate where in the airbag 11 the restrictor 26 is located.

A restrictor 26 may be positioned at any point within the airbag 11. FIG. 4 illustrates that restrictors 26 may be positioned between the rear panel 16 and the middle panel 14 or between the middle panel 14 and the front panel 12. FIG. 4 further illustrates that a restrictor 26 may function both as a restrictor and as a vent passage 32. The restrictor 26,32 nearest the end of the inflation gas path P includes a vent passage 32.

A central restrictor 46 is a restrictor 26 which is positioned at substantially the center point of an airbag 11. A central restrictor 46 is located between a middle panel 14 and a front panel 12. A central restrictor 46 is not located between a rear panel 16 and a middle panel 14. And, a central restrictor 46 is generally not located between a rear panel 16 and a front panel 12. In addition to the regular functions of a restrictor 26, a central restrictor 46 restrains the center point of the front panel 12. The center point of the front panel 12 has the potential to move closest to the occupant once the airbag 11 is inflated. By restraining the center point, the central restrictor 46 cooperates with the other restrictors 26 to restrain the front surface of the front panel 12. By doing so, the potential for injury to the occupant is decreased.

As well as the ability to provide restrictor 26 and vent passage 32 features, one or more restrictors 26, alone or in combination, provide an internal tethering feature for the system 11. This feature is indicated generally by the tether 48 in FIG. 4. A tether's 48 function and purpose are discussed above. In FIG. 4, the restrictors 26 serve as tethers 48 between the rear panel 16 and middle panel 14. The restrictors 26 also serve as tethers 48 between the inflator 20 and the seam 36. Combining the restricting effects of the restrictors 26 and the central restrictor 46 creates an internal tether 48 between the inflator 20 and the front panel 12.

Figure 5:
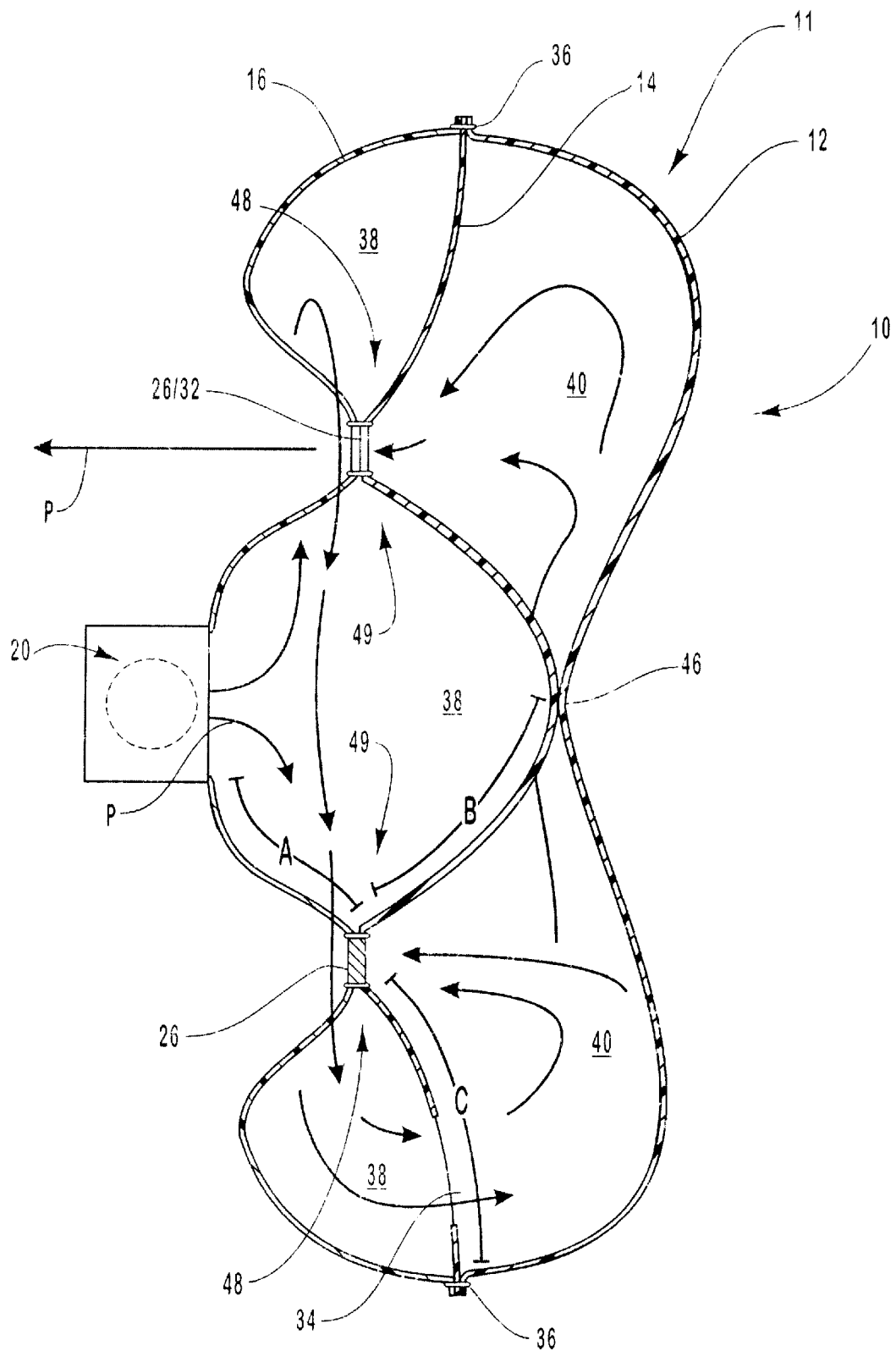
FIG. 5 is a cross-sectional side view of one embodiment of the present invention illustrating the internal tethering of the present invention.

FIG. 5 is a cross-sectional side view of one embodiment of the present invention illustrating the internal tethering in greater detail. FIG. 5 illustrates a multi-chamber airbag venting system 10 which includes restrictors 26, a central restrictor 46, and the other components discussed above. FIG. 5 further illustrates the lengths A, B, and C which cooperate to provide the tethering feature.

FIG. 5 illustrates two tethers 48 which restrict radial movement of the seam 36 and two tethers 48 which restrict forward movement of the front panel 12. More or fewer tethers 48 may be provided depending on the number and position of the restrictors 26 and central restrictor 46. A tether 48 which restricts the forward movement of the front panel includes length A and length B. Length A is a length of the rear panel 16 between an inflator 20 and a restrictor 26. Length B is a length of the middle panel 14 between a restrictor 26 and a central restrictor 46. As the airbag 11 inflates the front panel 12 moves towards the occupant. Length A and length B cooperate to restrain the forward movement of the front panel 12. In this way, the tether 48 presents a generally planar front surface and reduces the likelihood that the front panel 12 will cause injury to the occupant.

Similarly, a tether 48 which restricts radial movement of the seam 36 includes length A and length C. Length A is the same length described above. Length C is a length of the middle panel 14 between a restrictor 26 and a seam 36. As the airbag 11 inflates, the seam 36 moves radially away from the inflator 20. Length A and length C cooperate to restrain the radial movement of seam 36.

The embodiment of the present invention illustrated in FIG. 5 provides several tethers 48. These tethers 48 are positioned in the interior of the airbag 11. There are no additional structures required to form tethers 48. Therefore, the multi-chamber airbag venting system 10 provides all the benefits of internal tethering without requiring any assembly beyond the formation of the restrictors 26 and central restrictor 46.

Figure 6:
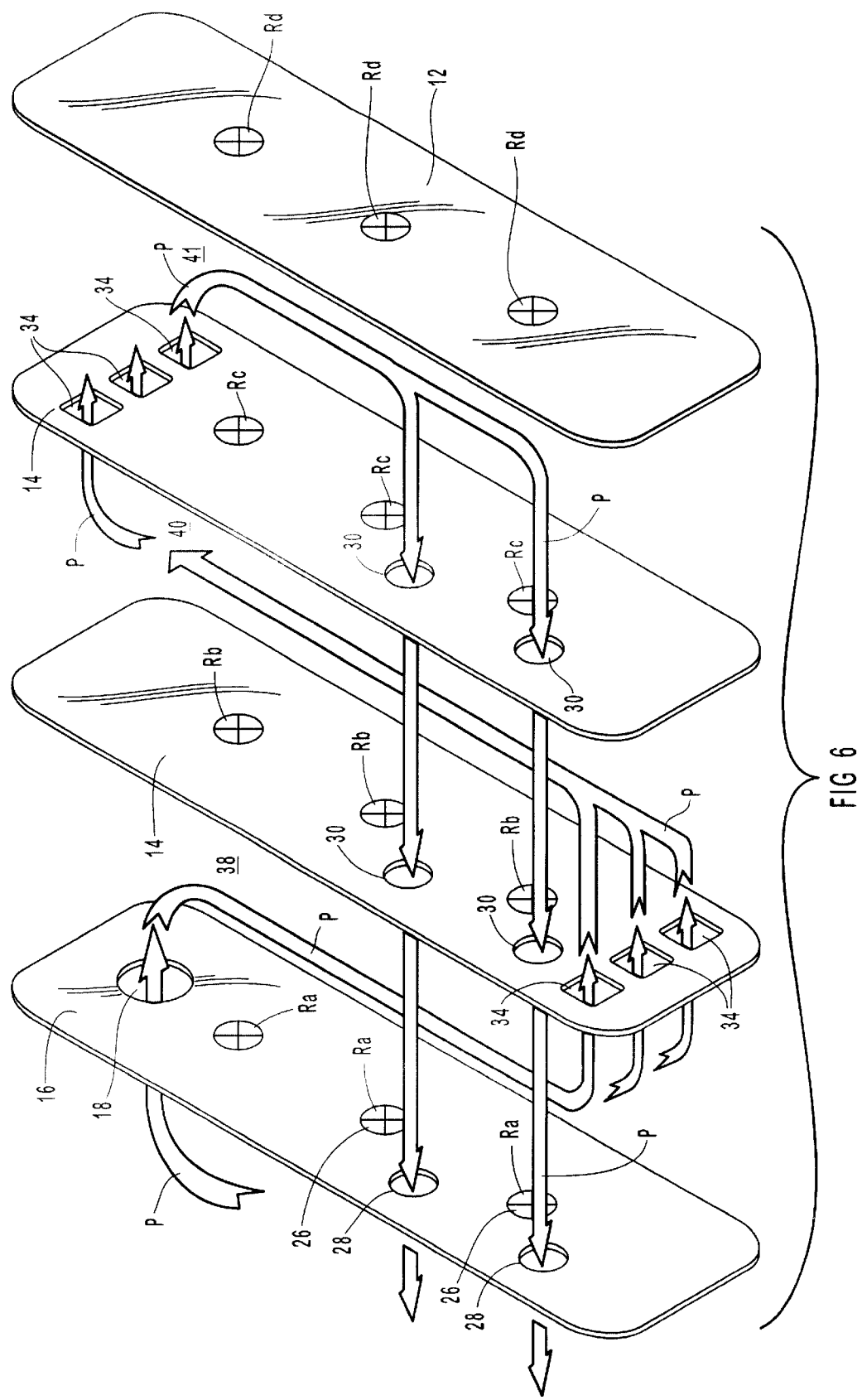
FIG. 6 is an exploded perspective view of a front panel and a rear panel having a plurality of middle panels positioned in between according to one embodiment of the present invention.

FIG. 6 is similar to FIG. 2 above. FIG. 6 illustrates a plurality of middle panels 14 and the gas channeling feature indicated by path P. In addition to the structures and elements described in relation to FIG. 2, FIG. 6 includes an additional chamber 41 which is formed by including an additional middle panel 14. Together the first chamber 38, second chamber 40, and additional chamber 41 form a plurality of chambers between the front panel and rear panel. The airbag mouth 18 and middle panel passage holes 34 may be strategically positioned to channel the inflation gas through the chambers 38, 40, 41. At least one vent hole 30 may also be included to channel inflation gas.

FIG. 6 includes restrictors 26 having portions Ra, Rb, Rc, and Rd. As described in FIGS. 2 and 5 above, these portions may form lengths A, B, C. The lengths may cooperate to form a tether which restricts the forward movement of the front panel 12. Similarly, the lengths may cooperate to form a second tether between the airbag mouth 18 and the outside edge of the airbag 11. For example, a restrictor 26 may connect portion Ra to Rb which forms lengths A and C. As mentioned in relation to FIG. 5, lengths A, and C may cooperate to form the second tether which restricts the radial expansion of the airbag 11.

Referring generally to FIGS. 1–5, the present invention provides a multi-chamber airbag venting system 10 which provides for channeling of inflation gas, simple internal tethers to provide a safe inflation phase, a generally planar impact surface, prevents pre-mature venting without increasing the size of airbag 11 components, and a fully inflated airbag 11 which deforms properly upon impact with an occupant. The vent passages 32, middle panel passage holes 34, and restrictors 26 provide the necessary design tools to achieve an improved performance characteristic over conventional airbags.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. An airbag comprising:
   a front panel, the front panel forming an impact surface for the airbag;
   a rear panel having an airbag mouth and a first vent hole disposed therein, wherein the rear panel is connected to the front panel along the respective circumferential peripheries of said front panel and said rear panel, the rear panel forming a rear surface for the airbag;
   a middle panel connected between the front panel and the rear panel such that said airbag is divided into a first chamber behind the middle panel and a second chamber in front of the middle panel;
   a second vent hole disposed in the middle panel such that inflation of the airbag brings the second vent hole in line with the first vent hole to form a vent passage between the second chamber and an area external to said airbag; and
   a middle panel passage hole disposed in the middle panel and configured to channel gas from the first chamber to the second chamber throughout the inflation phase of the airbag.

2. An airbag as in claim 1, wherein the middle panel is connected to the rear panel along the respective circumferential peripheries of said middle and rear panels circumferential periphery.

3. An airbag as in claim 1, further comprising a plurality of first vent holes in the rear panel and a corresponding plurality of second vent holes in the middle panel such that a plurality of vent passages are formed following inflation of the airbag.

4. An airbag as in claim 1, further comprising a plurality of middle panel passage holes disposed in the middle panel.

5. An airbag as in claim 4, wherein the plurality of middle panel passage holes are disposed along the perimeter of the middle panel.

6. An airbag as in claim 1, wherein the airbag is a vehicle passenger airbag.

7. An airbag as in claim 1, wherein the airbag is a vehicle driver's side airbag.

8. An airbag comprising:
   a front panel, the front panel forming an impact surface for the airbag;
   a rear panel having an airbag mouth and a first vent hole disposed therein, wherein the rear panel is connected to the front panel along the respective circumferential peripheries of said front panel and said rear panel, the rear panel forming a rear surface for the airbag;
   a middle panel connected between the front panel and the rear panel such that said airbag is divided into a first chamber behind the middle panel and a second chamber in front of the middle panel;
   a second vent hole disposed in the middle panel and attached to the first vent hole to form a vent passage between an area external to the airbag and the second chamber;
   a middle panel passage hole disposed in the middle panel and configured to channel gas from the first chamber to the second chamber throughout the inflation phase of the airbag; and
   a tether formed by connecting the middle panel to a portion of the front panel and by connecting the middle panel to a portion of the rear panel.

9. An airbag as in claim 8, further comprising a plurality of middle panel passage holes disposed along the perimeter of the middle panel.

10. An airbag as in claim 9, further comprising a plurality of first vent holes in the rear panel and a corresponding plurality of second vent holes in the middle panel, said plurality of second vent holes attached to said plurality of first vent holes such that a plurality of vent passages are formed.

11. An airbag as in claim 10, wherein the airbag is a vehicle driver's side airbag.

12. An airbag as in claim 10, wherein the airbag is a vehicle passenger airbag.

13. An airbag as in claim 12, wherein the front panel, rear panel, and middle panel are rectangular.

14. An airbag as in claim 13, wherein the front panel, rear panel and middle panel are made of fabric.

* * * * *